US011799742B2

(12) United States Patent
Hussain et al.

(10) Patent No.: US 11,799,742 B2
(45) Date of Patent: *Oct. 24, 2023

(54) RESOLVING CONFIGURATION DRIFT FOR COMPUTING RESOURCE STACKS

(71) Applicant: Amazon Technologies, Inc., Seattle, WA (US)

(72) Inventors: Amjad Hussain, Bellevue, WA (US); Anil Kumar, Seattle, WA (US); Ryan John Lohan, Seattle, WA (US); Diwakar Chakravarthy, Kirkland, WA (US); Julio Cesar dos Santos Lins, Seattle, WA (US); Prabhu Anand Nakkeeran, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/897,524

(22) Filed: Aug. 29, 2022

(65) Prior Publication Data
US 2023/0044491 A1 Feb. 9, 2023

Related U.S. Application Data

(63) Continuation of application No. 17/019,891, filed on Sep. 14, 2020, now Pat. No. 11,431,586, which is a (Continued)

(51) Int. Cl.
*H04L 41/5025* (2022.01)
*H04L 41/5041* (2022.01)
(Continued)

(52) U.S. Cl.
CPC ...... *H04L 41/5025* (2013.01); *H04L 41/0813* (2013.01); *H04L 41/0866* (2013.01);
(Continued)

(58) Field of Classification Search
CPC ............ H04L 41/5025; H04L 41/0813; H04L 41/0866; H04L 41/22; H04L 41/5048; H04L 41/5054; H04L 47/70
See application file for complete search history.

(56) References Cited

U.S. PATENT DOCUMENTS 8,949,305 B1  2/2015  White
9,916,551 B1  3/2018  Bandopadhyay
(Continued)

OTHER PUBLICATIONS

Office Action for U.S. Appl. No. 17/019,891, dated Oct. 1, 2021, Hussain, "Resolving Configuration Drift for Computing Resource Stacks", 8 pages.

*Primary Examiner* — Azizul Choudhury
(74) *Attorney, Agent, or Firm* — Lee & Hayes, P.C.

(57) ABSTRACT

This disclosure describes techniques for resolving discrepancies that occur to interrelated computing resources from computing resource drift. Users may describe computing resources in an infrastructure template. However, computing resource drift occurs when "out-of-band" modifications are made to the computing resources and are not reflected in the infrastructure template. To resolve discrepancies between the infrastructure template and the out-of-band modifications to the computing resources, a notification may be output to a user account associated with the computing resources detailing the differences. An updated infrastructure template may be received that resolves the differences, such as by including configuration settings that reflect a current state of the computing resources. The computing resources may then execute a workflow using the updated template, such that the workflow is executed on all of the computing resources in a current state.

20 Claims, 10 Drawing Sheets

Related U.S. Application Data continuation of application No. 16/220,719, filed on Dec. 14, 2018, now Pat. No. 10,778,539.

(51) Int. Cl.
*H04L 41/5054* (2022.01)
*H04L 41/22* (2022.01)
*H04L 41/0813* (2022.01)
*H04L 47/70* (2022.01)
*H04L 41/0866* (2022.01)

(52) U.S. Cl.
CPC .......... *H04L 41/22* (2013.01); *H04L 41/5048* (2013.01); *H04L 41/5054* (2013.01); *H04L 47/70* (2013.01)

(56) References Cited

U.S. PATENT DOCUMENTS

| | | | |
|---|---|---|---|
| 10,778,539 B1* | 9/2020 | Hussain | H04L 47/70 |
| 10,789,104 B2 | 9/2020 | Ivanov et al. | |
| 11,431,586 B1* | 8/2022 | Hussain | H04L 47/70 |
| 2011/0225275 A1 | 9/2011 | Shah et al. | |
| 2014/0007121 A1 | 1/2014 | Caufield et al. | |
| 2017/0026240 A1 | 1/2017 | Purusothaman et al. | |
| 2018/0060184 A1 | 3/2018 | Thakkar et al. | |
| 2019/0095263 A1 | 3/2019 | Ahav et al. | |
| 2019/0294477 A1 | 9/2019 | Koppes et al. | |

\* cited by examiner

INTERFACE 300

Stack Management https://www.xyz.com/StackManagement

STACK MANAGEMENT CONSOLE 302

| Logical ID | Physical ID | Type | Resource Drift Status | Timestamp |
|---|---|---|---|---|
| ☐ DLQ | https://xyz.us-east-1.service.com/26 | Queue | Deleted | 2018-04-12 11:41:08 UTC-0700 |
| ☑ Queue | https://xyz.us-east-1.service.com/27 | Queue | Modified | 2018-04-11 15:07:09 UTC-0700 |

304

EXPECTED SETTINGS 306

{
 "DelaySeconds": 20,
 "MaximumMessagesSize": 262114,
 "MessageRetentionPeriod": 345600,
 "QueueName": "Drift-DEMO-Queue-T63J",
 "ReceiveMessageWaitTimeSeconds": 0,
 "RedrivePolicy": {
  "deadLetterTargetArn": "arn:sqs:us-e"
  "maxReceiveCount": 10
 },
 "VisibilityTimeout": 60
}

CURRENT SETTINGS 308

{
 "DelaySeconds": 20,
 "KmsDataKeyReusePeriodSeconds": 300,
 "KmsMasterKeyId": "alias/aws/sqs"
 "MaximumMessagesSize": 262144,
 "MessageRetentionPeriod": 345600,
 "QueueName": "Drift-DEMO-Queue-T63J",
 "ReceiveMessageWaitTimeSeconds": 0,
 "VisibilityTimeout": 600
}

DIFFERENCES 310

Select all | Clear

☑ RedrivePolicy – REMOVE
☑ VisibilityTimeout – NOT_EQUAL
☑ KMSMasterKeyID – ADD
☑ KMSDataKeyReusePeriod – ADD

FIG. 3

RESOLVING CONFIGURATION DRIFT FOR COMPUTING RESOURCE STACKS

RELATED APPLICATIONS

This application claims priority to and is a continuation of U.S. patent application Ser. No. 17/019,891, filed on Sep. 14, 2020, which claims priority to and is a continuation of U.S. patent application Ser. No. 16/220,719, filed on Dec. 14, 2018, the entire contents of which are incorporated herein by reference.

BACKGROUND

Many companies and other organizations operate computer networks that interconnect numerous computing systems to support their operations. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. However, as the scale and scope of typical data centers has increased, the tasks of provisioning, administering, and managing the physical computing resources have become increasingly complicated. For example, problems may arise when changes are made to a subset of computing resources included in a group of interrelated computing resources, causing discrepancies between the interrelated computing resources.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates a graphical user interface (GUI) displaying details of drift detection for a selected computing resource from a resource stack according to various embodiments.

DETAILED DESCRIPTION

Figure 1A:
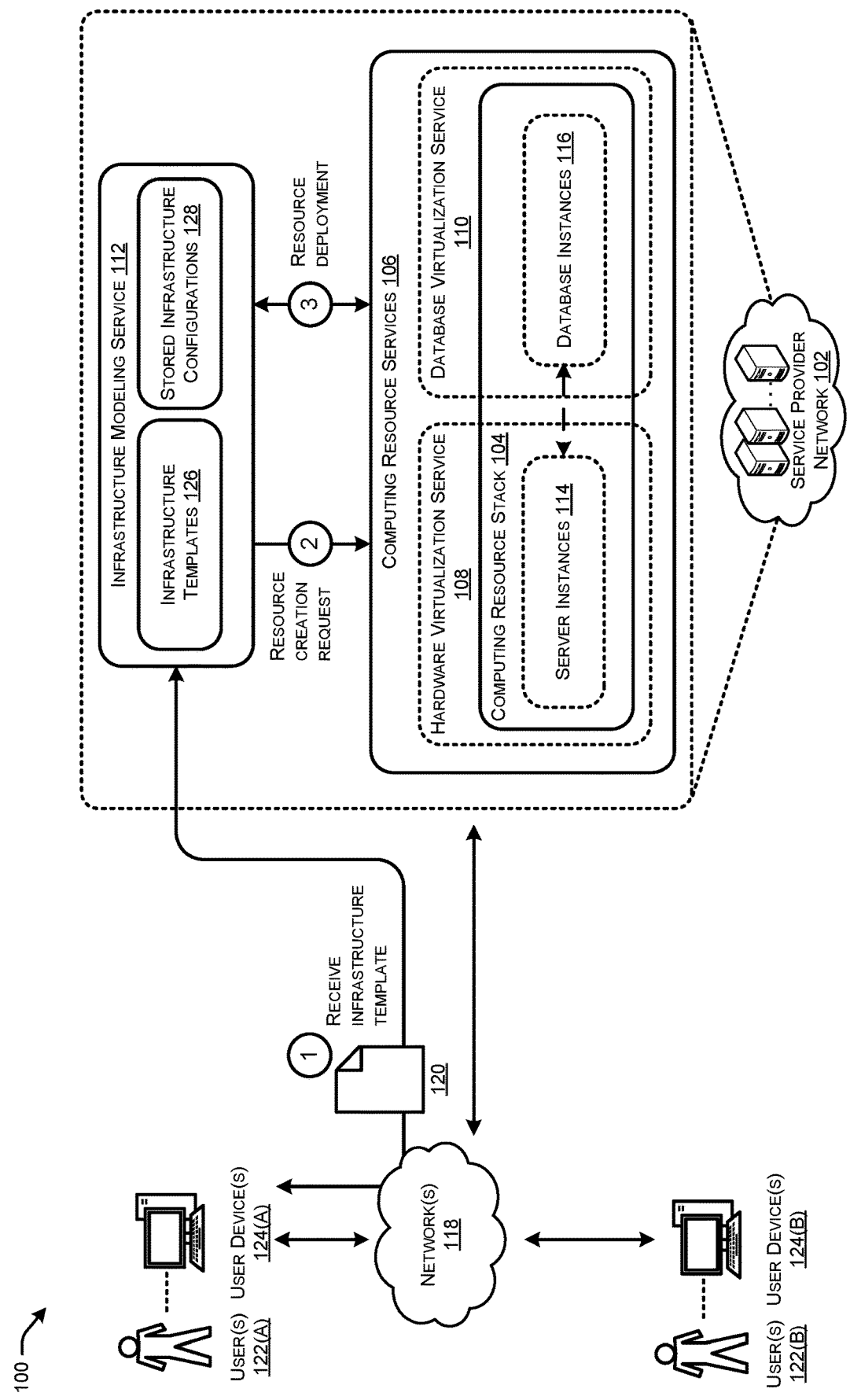
FIG. 1A illustrates a system-architecture diagram of an example environment in which a service provider network provisions a computing resource stack according to an infrastructure template.

This disclosure describes, at least in part, techniques for resolving "out-of-band" modifications to an interrelated set of computing resources, also referred to herein as a computing resource stack, that was provisioned at a service provider network using an infrastructure modeling service. An infrastructure modeling service, for instance, allows users to describe a computing resource stack in a text file or other type of descriptive representation, referred to herein generally as an infrastructure template, and to provision computing resource stacks defined in templates at a service provider network. The provisioning of computing resources defined in an infrastructure template may generally involve an infrastructure modeling service creating and configuring the resources using one or more computing resource services provided by the service provider network (for example, a hardware virtualization service to create compute instances, a database virtualization service to create database instances, and so forth). The use of an infrastructure modeling service enables users to provision computing resource stacks in an automated and repeatable manner, relieving users from performing many manual actions or writing custom scripts to provision computing resource stacks in an automated fashion.

In some examples, an infrastructure modeling service is able to identify modifications to a computing resource stack made outside of an infrastructure modeling service and to present information indicating such modifications to users. For example, as indicated above, users can use an infrastructure modeling service to automatically provision a computing resource stack at a service provider network. A computing resource stack can include a variety of interrelated computing resources such as, for example, server instances, database instances, other software components, as well as various types of associated system configurations, networking configurations, security configurations, and so forth. When a computing resource stack is deployed initially using an infrastructure modeling service, the configurations of the constituent computing resources generally are expected to match the configurations specified in the template used to create the resource stack (in addition to any default configuration values that may not have been explicitly defined in the template but are automatically configured by the services at which the computing resources are implemented). Users can modify various configurations associated with a computing resource stack, including to add or remove computing resources from the stack entirely, by modifying an associated infrastructure template and using the infrastructure modeling service to update the provisioned computing resources accordingly. Using the infrastructure modeling service in this manner helps to ensure that a provisioned computing resource stack and a corresponding infrastructure template describing the computing resource stack stay in sync with one another.

However, users may also at times make so-called "out-of-band" modifications to one or more computing resources of a provisioned computing resource stack, such as inadvertently or in response to time-sensitive demands. For example, if a provisioned computing resource stack includes one or more virtual machines (VMs) implemented by a hardware virtualization service, one or more users might make modifications to the VMs via interfaces provided by the hardware virtualization service (for example, using a web-based GUI, APIs, or other interfaces) or by modifying the VMs using a console interface or other direct interface to the VMs, either because the users are unaware that the VMs were created using the infrastructure modeling service or because the users are addressing an urgent issue involving the VMs. As another example, a software update or other type of change to a service implementing one or more computing resources of a stack may cause changes to various configuration settings after a computing resource stack is provisioned. These types of out-of-band modifications generally are not immediately visible to an infrastructure modeling service and, thus, the expected configuration settings associated with a provisioned computing resource stack (that is, any configuration settings specified in the infrastructure template and any default configuration values associated with the resources) and the actual, current configuration settings of the computing resources (that is, the current configuration settings of the computing resource stack including any out-of-band modifications made to one or more of the resources) can become out of sync. The difference between the expected, or baseline, configuration settings and the actual, live configuration settings of a computing resource stack may be referred to herein generally as "configuration drift."

The existence of configuration drift for a computing resource stack can be problematic for several reasons. For example, modifications to configuration settings associated with computing resources described in an infrastructure template can cause various types of failures to occur when users attempt to further modify and update a computing resource stack using the infrastructure modeling service, leading to operational pain and degraded customer experience. As one example, consider a database instance provisioned as part of a computing resource stack, where the database instance includes a configuration setting that defines an amount of allocated storage for the database instance. In some service provider networks, a value associated with this configuration setting is only allowed to increase (that is, the amount of allocated storage for the database instance can only increase) and attempts to set the allocated storage to a value less than its current value results in a failure. If a user makes an out-of-band modification to increase this allocated storage configuration setting, the infrastructure modeling service may not be aware of the change and assume that the value is the original baseline value. An attempt to update the computing resource stack using the infrastructure modeling service may thus lead to a stack update failure if the update attempts to set the allocated storage to a value lower than the current configured value, causing the stack update to rollback and leaving the user with the task of determining the point of failure and manually remediating the conflict. Many other types of potential configuration conflicts exist across the many different types of computing resources that can be provisioned using an infrastructure modeling service. Traditionally, users have been discouraged from making such out-of-band modifications to computing resources of a provisioned computing resource stack for these and other reasons, however, this guidance is difficult to mandate in practice as the number of computing resources and users associated with computing resource stacks increases. Further, as indicated above, sometimes customers may intentionally make out-of-band modifications to computing resources to respond to urgent operational events. Once configuration drift is detected, updating or replacing the infrastructure template leveraged by the infrastructure modeling service to represent a current state of computing resources prevents conflicts from arising between interrelated computing resources.

To facilitate users' ability to resolve such out-of-band configuration modifications and other forms of configuration drift, among other features, an infrastructure modeling service described herein includes tools that can be used to remedy computing resource stack configuration drift. According to embodiments described herein, for example, an infrastructure service may create a computing resource stack at the service provider network based on an infrastructure template created by a user. The computing resource stack may include any number of interrelated computing resources implemented using one or more computing resource services of the service provider network. For example, the computing resources can include resources implemented by a hardware virtualization service (for example, various types of server instances), by a database virtualization service (for example, one or more database instances), using various network and security related services (for example, to configure networks and security groups), and so forth. As indicated above, an infrastructure template includes configuration information that is used by the infrastructure modeling service to deploy and configure the one or more computing resources at the service provider network.

In some examples, configuration drift is detected amongst the interrelated computing resources. For instance, the one or more computing resource services at which the computing resources are implemented may modify a configuration setting of the computing resource stack, such as in response to an out-of-band request to modify the configuration setting, or may modify the configuration setting based on other event types. As indicated above, although an infrastructure modeling service can be used to modify resources of a computing resource stack by modifying a corresponding infrastructure template, there may be instances where one or more users make out-of-band modifications to the computing resource either inadvertently or to address urgent issues.

The infrastructure modeling service may identify configuration drift for a computing resource stack resulting from the modification. For example, the infrastructure modeling service may request information describing the resource from a service at which the computing resource is implemented. A user may, for example, use a graphical console interface, a command line interface (CLI), or application programming interface (API) request to request that configuration drift detection be performed. In other examples, the initiation of a configuration drift detection may occur without direct user input and may be initiated, for example, based on a recurring schedule, in response to input from another application or service, in response to identifying a modification made to one or more resources of the computing resources stack, or based on any other event.

In some examples, the infrastructure modeling service may then detect a current state of the configuration settings associated with the one or more computing resources of the computing resource stack. The infrastructure modeling service can then compare the current state to the computing resources previously provisioned by the infrastructure template to identify any differences between the two (for example, to identify whether any configuration settings have been modified, whether any configurations or entire computing resources have been added or deleted, and so forth).

In an embodiment, the infrastructure modeling service may output information indicating identified differences between the configuration settings of computing resources previously provisioned by the infrastructure template and the configuration settings representing a current state of the computing resources provisioned in the service provider network. For example, users may view configuration drift details, including configuration setting differences, using various GUIs, command line interface (CLI) commands, and APIs provided by the infrastructure provisioning service. Outputting the information indicating identified differences between the configuration settings of computing resources previously provisioned by the infrastructure template and the configuration settings representing a current state of the computing resources gives users an opportunity to resolve the differences on a system level, such that the interrelated computing resources function as desired.

For instance, the infrastructure modeling service may receive a second infrastructure template that includes configuration settings associated with the current state of the computing resources of the computing resource stack. The second infrastructure template may be used to execute workflows by the infrastructure modeling service based on the actual, current state of the computing resources. Therefore, to resolve the detected configuration drift, it may be desired for the second infrastructure template to match the current live state of the computing resources, taking the out of band modifications into account. The infrastructure modeling service may verify that the second infrastructure template reflects the current state of the computing resources including the out of band modifications. The second infrastructure template may be verified by, for example, generating values representing an intended state of the second computing resources. In other words, the second infrastructure template may be verified by discerning an outcome of the second infrastructure template without actually implementing the second infrastructure template, to safely determine whether the second infrastructure template reflects the live state of the computing resources.

Once the second infrastructure template is verified for accuracy with the live state of the computing resources, the infrastructure modeling service may use the second infrastructure template to replace the original infrastructure template, thus providing an accurate representation of the computing resources of the computing resource stack. Alternatively, in some cases, the infrastructure modeling service may modify the original infrastructure template based on the differences between the original infrastructure template and the second infrastructure template, such as by adding, removing, or changing content included in the original infrastructure template so that the content in the original infrastructure template matches the second infrastructure template. Continuing with the example above relating to the database instance that defines an amount of allocated storage, receipt of an updated infrastructure template that reflects the current state of the database system following the out-of-band modification may prevent a stack update failure that requires the user to determine the point of failure and manually remedy the conflict. Using the second infrastructure template (or content from the second infrastructure template), the infrastructure modeling service may execute workflows reliably using the interrelated computing resources of the computing resource stack.

The ability to easily and automatically detect configuration drift in a computing resource stack and resolve differences caused by the configuration drift provides users with reliability when executing configuration changes that are otherwise difficult to manage. Thus, users are able to plan for and readily take corrective actions when needed and also make out-of-band changes in time-sensitive situations knowing that the modifications can be readily identified and resolved at a later time. Further, verifying that the second infrastructure template reflects a live state of the computing resources after drift is detected ensures that updates are made safely and uniformly across all of the shared computing resources.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a system-architecture diagram of an example environment 100 in which a service provider network 102 provisions a computing resource stack 104 according to an infrastructure template. In some embodiments, computing resource services 106 (including a hardware virtualization service 108 and a database virtualization service 110 in the example environment 100, but which may include any number of services in practical implementations) and an infrastructure modeling service 112 operate as part of the service provider network 102 and each comprise one or more software modules executed by one or more electronic devices at one or more geographic locations and data centers managed by the service provider.

The service provider network 102 allows users to utilize one or more of a variety of types of computing-related resources, such as computing resources (for example, executing virtual machine (VM) instances and/or containers, executing batch jobs, executing code without provisioning servers), data/storage resources (for example, object storage, block-level storage, data archival storage), network-related resources (for example, configuring virtual networks including groups of compute resources, content delivery networks (CDNs), Domain Name Service (DNS)), application resources (for example, databases, application build/deployment services), and so forth. These and other computing resources may be provided as services, such as the hardware virtualization service 108 that can execute server instances 114, the database virtualization service 110 that can execute database instances 116, a storage virtualization service that can store data objects, and so forth. The users (or "customers") of the service provider network 102 may utilize one or more user accounts that are associated with a customer account, though these terms may be used somewhat interchangeably depending upon the context of use. Users may interact with the service provider network 102 across one or more networks 118 (for example, the internet) via one or more interface(s), such as through use of application programming interface (API) calls, via a console implemented as a website or application, etc. The interface(s) may be part of, or serve as a front-end to, a control plane of the service provider network 102 that includes "backend" services supporting and enabling the services that may be more directly offered to customers.

To provide these and other computing resource services, the service provider network 102 may rely upon virtualization techniques. For example, virtualization technologies may be used to allow users to control or utilize server instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple server instances can be implemented using a single electronic device. Thus, a user may directly utilize a server instance hosted by the service provider network 102 to perform a variety of computing tasks, or may indirectly utilize a server instance by submitting code to be executed by the service provider network, which in turn utilizes a server instance to execute the code (typically without the user having any control of or knowledge of the underlying server instance(s) involved).

As indicated above, it is desirable at times for users to identify configuration drift associated with computing resources of a computing resource stack, for example, the computing resource stack 104 created using the infrastructure modeling service 112 and based on an infrastructure template 116 describing the computing resource stack 104. As indicated above, configuration drift generally refers to differences between an expected set of configuration settings associated with a computing resource stack (for example, as indicated by a corresponding infrastructure template and any default configuration values associated with the computing resources) and a current set of configuration settings associated with the computing resource stack. A user may desire to identify such configuration drift so that the user can reconcile the current configuration settings and a corresponding infrastructure template, for example, to avoid issues with updating the computing resource stack using an out of sync infrastructure template, among other reasons.

For example, at the circle labeled "1" in FIG. 1A, a user 122(A) provides an infrastructure template 120 to the infrastructure modeling service 112 as part of a computing resource stack creation request to create a computing resource stack. In some embodiments, a user device 124(A) may include a GUI configured with user interface elements that allow a user 122(A) to create, modify, view, and select from infrastructure templates 126 used to provision computing resource stacks (for example, a computing resource stack 104) at the service provider network 102. In one embodiment, an infrastructure template is a file (for example, a JavaScript Object Notation (JSON) or YAML-formatted text file) that describes the computing resources and associated configuration settings used to implement a computing resource stack, along with descriptions of interconnections among the resources. In this example, the user 122(A) may use such a GUI to select a particular infrastructure template from the infrastructure templates 126 provided by the infrastructure modeling service 112 and to provide further input indicating a desire to create the computing resource stack described therein at the service provider network 102, thereby causing an electronic device 124(A) to generate a computing resource stack creation request. In other examples, the infrastructure template 120 may be generated by the user 122(A) and provided to the infrastructure modeling service 112 as part of a computing resource stack creation request, without utilization of the infrastructure templates 126 provided by the infrastructure modeling service 112.

In an embodiment, at circle "2," based on the infrastructure template 120 received as part of a computing resource stack creation request, the infrastructure modeling service 112 uses the infrastructure template 120 to provision a computing resource stack 104 at the service provider network 102 according to the configuration settings indicated in the template. To provision the computing resource stack 104, the infrastructure modeling service 112 may interact with one or more computing resource services 106 (for example, by generating one or more resource creation requests via APIs or other interfaces) to create and configure each computing resource of the stack using the various services. In the example system 100, the computing resource stack 104 includes one or more server instances 114 implemented at a hardware virtualization service 108 and one or more database instances 116 implemented at a database virtualization service 110; in general, a computing resource stack 104 can include any number of separate computing resources involving any number of separate computing resource services 106 (including, for example, a virtualized storage service, a virtual networking service, a network security service, and so forth). At circle "3," the computing resource service 106 leverages the infrastructure template 120 and the infrastructure modeling service 112 to deploy resources associated with the computing resource stack 104. Assuming the deployment of the user's computing resource stack 104 was successful, the infrastructure modeling service 112 may inform the user 122(A) of the successful deployment and the user can begin using the computing resource stack 104 as desired.

In some examples, the infrastructure modeling service 112 includes stored infrastructure configurations 128, such as "snapshots" indicating configuration settings associated with computing resources of the provisioned computing resource stack 104. The stored infrastructure configurations 128 may include a baseline snapshot created at some point in time after the computing resource stack 104 is deployed at the service provider network 102, such as configuration settings indicated in a corresponding infrastructure template 120 as well as any default configuration values that were not explicitly indicated in the infrastructure template but were automatically configured by the various services responsible for creating the resources. In one embodiment, the stored infrastructure configurations 128 are stored as one or more records in a database or other data store managed by the infrastructure modeling service 112 (for example, alongside other stored configuration snapshots associated with other computing resource stacks). In general, a stored version of a baseline configuration snapshot includes, for one or more computing resources in the computing resource stack, a set of configuration settings (for example, various parameters and corresponding values), and may further include information indicating which computing resource stack each resource belongs to, a name of the computing resource, a version of the computing resource stack, and so forth. For example, the configuration settings for a database instance might include a setting indicating a type of database engine (for example, "Engine: mysql" where "Engine" is the parameter and "mysql" is the associated value), an amount of allocated storage (for example, "AllocatedStorage: 32"), a username and password (for example, "MasterUsername: user" and "MasterUserPassword: useruser"), and so forth.

In some examples, a baseline configuration snapshot included in the stored infrastructure configurations 128 may typically be created at a point in time close to the deployment of the associated computing resource stack 104 at the service provider network 102. For example, the infrastructure modeling service 112 may monitor status information associated with the computing resource stack creation process (for example, during circle "3" in FIG. 1) and once the status indicates that the stack creation process is complete, the service 112 can generate a baseline configuration snapshot to be included in the stored infrastructure configurations 128. In an embodiment, if a user uses the infrastructure modeling service 112 to subsequently update a computing resource stack (for example, by modifying a corresponding infrastructure template 120 to change one or more resource configuration settings, add or remove one or more computing resources, or so forth), the infrastructure modeling service 128 can update and/or replace the previously created baseline configuration snapshot once it determines that the computing resource stack update process has completed (for example, by again requesting the current configuration settings for some or all of the computing resources of the resource stack from the associated computing resource services 106). In some embodiments, an originally created baseline configuration snapshot may be modified to reflect any detected updates and stored in the stored infrastructure configurations 128. In other embodiments, a new baseline configuration snapshot may be created for the updated computing resource stack and included in the stored infrastructure configurations 128.

Figure 1B:
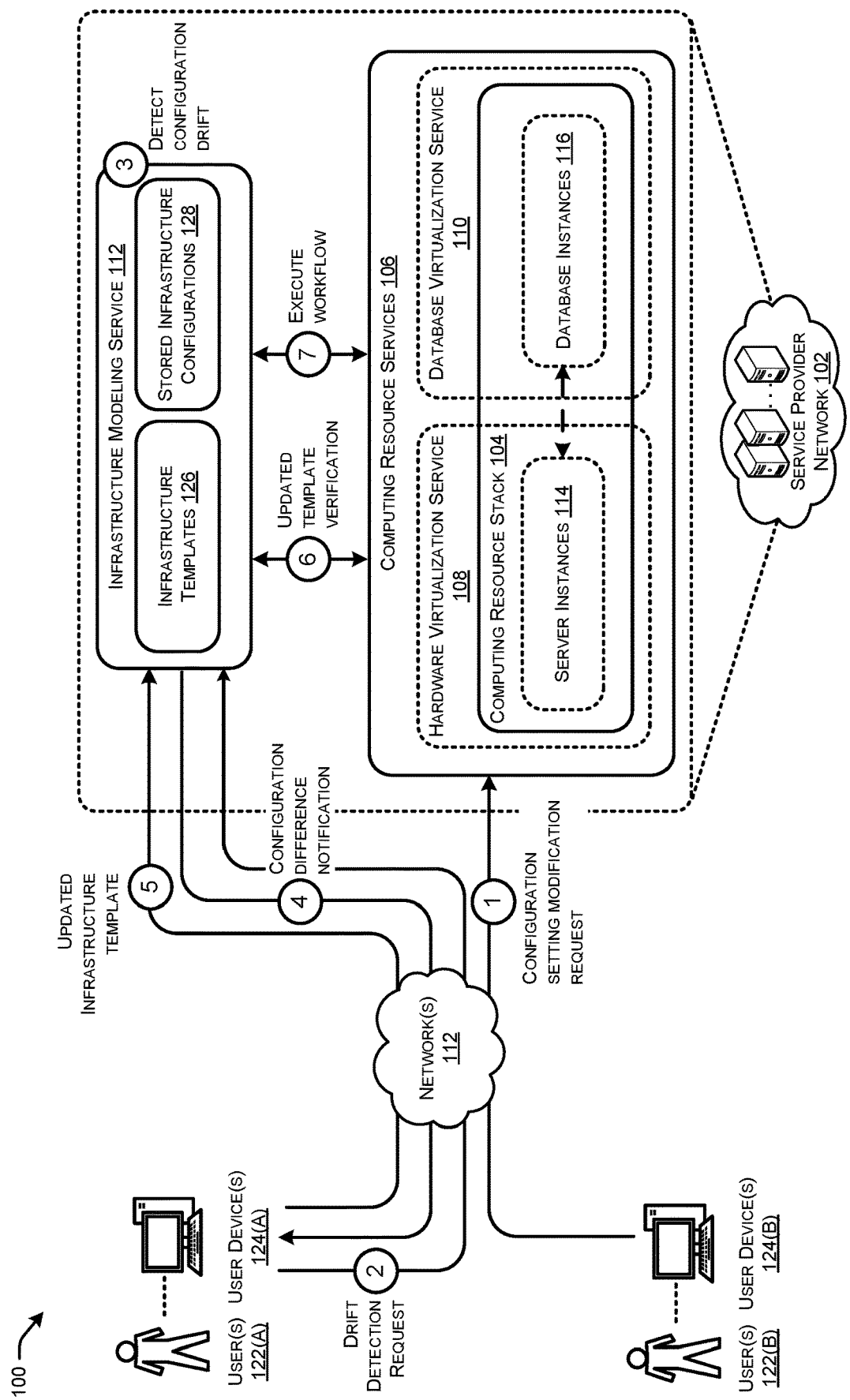
FIG. 1B illustrates a system-architecture diagram of an example environment in which a service provider network updates a computing resource stack according to an updated infrastructure template.

FIG. 1B illustrates a system-architecture diagram of the example environment 100 in which the service provider network 102 updates the computing resource stack 104 according to an updated infrastructure template.

As discussed above, in some cases, the computing resource services 106 may receive one or more out-of-band configuration setting modification requests, such as is indicated at circle "1" of FIG. 1B. For example, the out-of-band configuration setting modification requests may be generated by a same user 122(A) that initially created the computing resource stack 104. However, as shown in FIG. 1B, a different user 122(B) who may be associated with the user 122(A), for example, as part of the same application development or system administration team may generate the out-of-band configuration setting modification request. In some examples, an out-of-band configuration setting modification request can include various types of requested modifications to one or more computing resources of a computing resource stack. For example, the requested modifications may include changes to one or more configuration settings associated with a computing resource, deletion of one or more configuration settings, or the deletion of a computing resource entirely. In some embodiments, an out-of-band configuration request can be made using an API or other interface provided by a computing resource services 106 or, in other examples, can be made by a user interacting directly with a computing resource (for example, by using an interface provided by a VM to modify various configurations of the VM, directly modifying configuration files associated with a resource, and so forth).

In some examples, an out-of-band configuration change may occur to one or more computing resources of a computing resource stack based on an event that is not directly related to an action taken by a user 122(A) or 122(B). For example, a software or service update to a computing resource service 106 may change one or more default or configured values for computing resources implemented by the service, or the configuration settings may be modified by another application or service. As another example, a service provider network may expose new configuration values for one or more types of computing resources that were initially not available for configuration when a computing resource stack was created.

At circle "2" of FIG. 1B, the user 122(A) provides a drift detection request to the infrastructure modeling service 112. For example, the user 122(A) using a computing resource stack management GUI console, CLI, or other interface may identify the computing resource stack 104, or one or more selected computing resources of the stack, and further indicate a desire to detect configuration drift for the resources. The infrastructure modeling service 112, for example, may provide API actions for detecting configuration drift for an entire computing resource stack (for example, a "DetectStackDrift" action) and for detecting configuration drift for one or more individual resources in a computing resource stack (for example, a "DetectStackResourceDrift" action) or may provide a single API action with parameters to indicate whether to detect drift for one or more selected computing resources or an entire computing resource stack. The infrastructure modeling service 112 may also provide an API action to request status information for a requested configuration drift detection process (for example, to provide an indication of whether a requested drift detection process is currently in-progress, completed, or failed). However, in some examples, a configuration drift detection process may be triggered by events other than receipt of a user-generated drift detection request. For example, the infrastructure modeling service 112 may automatically initiate configuration drift detection on a computing resource stack on a periodic basis (for example, once an hour, once a day), based on a user-defined schedule, in response to a request generated by another application or service, or based on any other type of triggering event.

In some examples, the infrastructure modeling service 112 can be configured to dynamically monitor a computing resources stack for drift configuration, as part of circle "2." For example, the infrastructure modeling service 112 can be configured to monitor a resource stack for configuration updates by regularly polling the resources for information related to configuration updates, or the infrastructure modeling service 112 may receive event messages or other types of notifications from the corresponding computing resource services or from a separate monitoring service in response to occurrences of resource configuration updates. Upon receiving an indication of a configuration update, the infrastructure modeling service 112 may determine whether the update was caused by the infrastructure modeling service 112 (for example, in response to a user modifying an infrastructure template and using the infrastructure modeling service 112 to update the corresponding resource stack) and thus does not represent configuration drift. If it is determined that a configuration update was not caused by the infrastructure modeling service 112 and thus represents an out-of-band update, the infrastructure modeling service 112 can compare the identified configuration update against a corresponding baseline snapshot (e.g., from the stored infrastructure configurations) to determine whether the current configuration has actually drifted. The infrastructure modeling service 112, at circle "3," detects configuration drift by identifying configuration modifications, such as by comparing the identified configuration update to the corresponding baseline snapshot included in the stored infrastructure configurations.

In an embodiment, in response to dynamically detecting that drift has occurred for one or more computing resources of a stack, the infrastructure modeling service 112 may generate a user alert or other type of notification to indicate to a user associated with the computing resource stack that the configuration drift has occurred. For example, at circle "4" of FIG. 1B, the infrastructure modeling service 112 may output information to be presented in a console GUI by the user device 124(A) to the user 122(A) to highlight differences between the stored infrastructure configuration 128 and the configuration setting modification to the computing resource stack 104. The infrastructure modeling service 112 may select the user 122(A) for output of the notification based on receiving the original infrastructure template from the user 122(A) as pictured, and/or may select the user 122(B) for output of the notification based on receiving the configuration setting modification request from the user 122(B). Other users may be selected alternatively or in addition to the users 122(A) and 122(B) pictured, such as based on administration settings associated with the computing resource stack 104, which resources are changed in the configuration setting modification request, and so forth. The configuration difference notification may include indications of configuration setting modifications made to the computing resource stack 104, such as an addition of a resource, a deletion of a resource, a change of a value of a resource, and so forth.

Based on receiving the configuration difference notification, the user 122(A) may provide an updated infrastructure template to the infrastructure modeling service as indicated by circle "5" of FIG. 1B. In some examples, the updated infrastructure template may include the configuration settings applied as a result of the out-of-band configuration setting modification request to the computing resource stack 104 to resolve the configuration drift resulting from the out-of-band changes. By applying the changes made out-of-band to the computing resource stack 104 to the infrastructure template used by the infrastructure modeling service 112 to provision resources, problems arising from discrepancies between the infrastructure template and the computing resource stack 104 may be avoided or lessened. Furthermore, by notifying the user of the specific differences between the original infrastructure template and the current state of the computing resource stack as a result of the out-of-band changes, the user may more quickly and efficiently resolve the differences within the infrastructure template to provide desired settings for the computing resources. Generally, the updated infrastructure template represents the current/live state, or snapshot, of the computing resource stack after the out of band changes have been made. For instance, the user(s) 122 may track changes made, and/or utilize the configuration difference notification, to determine how to create the updated infrastructure template that represents the current/live state of the computing resource stack 104.

To ensure that the updated infrastructure template reflects the live state of the computing resources, at circle "6" of FIG. 1B the infrastructure modeling service 112 verifies the updated template received from the user 122(A). The infrastructure modeling service 112 may verify the updated infrastructure template using techniques similar to those described for detecting drift amongst the computing resources of the computing resource stack 104. For example, the infrastructure modeling service 112 may provide an API action to return values from an entire computing resource stack, or may provide an API action to return values for one or more individual resources of a computing resource stack. However, in this case, the returned values represent an intended state of the computing resources of the computing resource stack if the updated infrastructure template were implemented, without first employing the updated infrastructure template to provision the computing resources and/or execute workflows. The values returned to the infrastructure modeling service 112 representing the intended state of the computing resources in accordance with the updated infrastructure template are compared to the current/live state of the computing resources to determine whether the updated infrastructure template corresponds to the live state. For example, the infrastructure modeling service 112 may compare values returned from an API action for the intended state of the computing resources based on the updated infrastructure template to values returned from an API action for the current/live state of the computing resources. In some examples, if the values from the updated infrastructure template do not correspond to the values of the current/live state of the computing resources, the infrastructure modeling service 112 may output a notification to the user 122(A) to provide another updated infrastructure template that reflects the live state.

In some examples, once the updated infrastructure template corresponds to the live state of the computing resources, the infrastructure modeling service 112 replaces the infrastructure template received as described in relation to FIG. 1A with the updated infrastructure template stored in the infrastructure templates 126 to maintain the configuration settings representing the current state of the computing resource stack 104. However, other examples are also contemplated, such as the infrastructure modeling service 112 determining differences between the original infrastructure template and the updated infrastructure template and modifying the original infrastructure template based on the determined differences. The infrastructure modeling service 112 shares the updated infrastructure template with the computing resource services 106 to provision the computing resource stack according to the received configuration settings. The infrastructure modeling service 112, for instance, may identify computing resources of the computing resource stack 104 (along with additional computing resource stacks associated with the user account which may be affected by configuration setting changes, for example), that are to be added, removed, changed, and so forth based on the updated infrastructure template and execute the changes with the computing resource services 106 accordingly. The computing resource stack 104 may then be used to execute workflows utilizing the configuration settings that accurately reflect the current state of the resources provisioned using the updated infrastructure template, as shown at circle "7" of FIG. 1B.

As an example, the original infrastructure template may indicate that a particular user 122 has 200 database instances 116 provisioned in their computing resource stack 104. However, the user 122 may have added 50 more database instances 116 via an out of band operation (e.g., configuration setting modification request at "1") resulting in 250 database instances 116. In such examples, using the original infrastructure template, the computing resource services 106 may only perform workflows on the 200 database instances 116, such as writing values to the database instances 116, performing software updates on the database instances 116, and/or other workflows. Thus, the additional 50 database instances 116 may not receive subsequent workflows. However, after receiving the updated infrastructure template that represents the current state/snapshot of the database instances 116 as including 250 instances, all 250 of the live database instances 116 may have workflows performed on them according to the updated infrastructure template.

Figure 2:
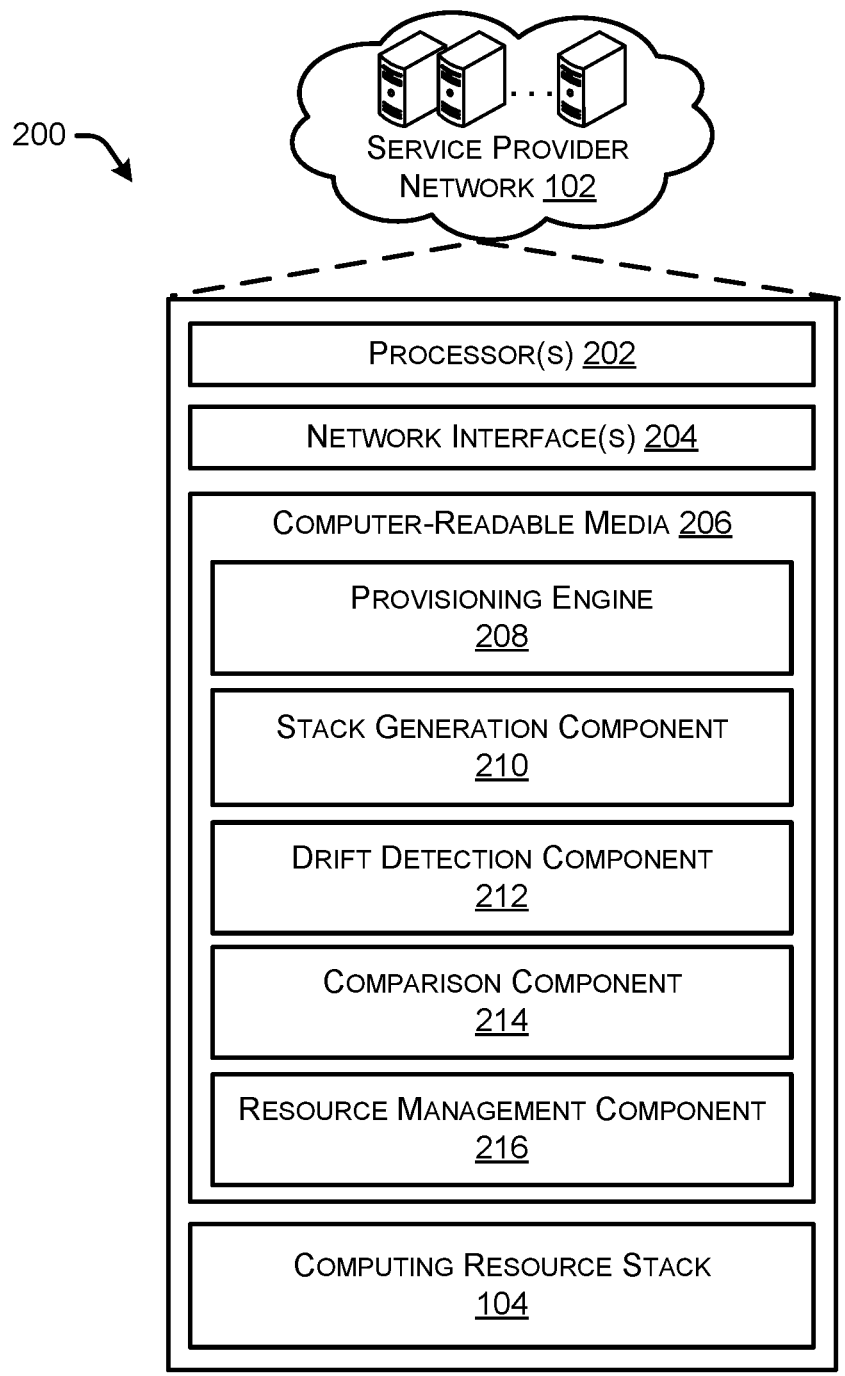
FIG. 2 illustrates a component diagram illustrating example components of a service provider network.

FIG. 2 illustrates a component diagram 200 illustrating example components of a service provider network 102. As illustrated, the service provider network 102 may include one or more hardware processors 202 (processors) configured to execute one or more stored instructions. The processor(s) 202 may comprise one or more cores. Further, the service provider network 102 may include one or more network interfaces 204 configured to provide communications between the service provider network 102 and other devices, such as the user device(s) 122(A) and 122(B). The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi™, and so forth.

The service provider network 102 may include computer-readable media 206 that stores a provisioning engine 208 configured to, when executed by the processor(s) 202, perform the resource provisioning, deployment, and/or administration operations described herein for managing the computing resource stack(s) 104. The provisioning engine 208 may receive an infrastructure template from a user, for instance, and leverage the content included in the infrastructure template as a single source of truth to standardize components used across a user account with the service provider network 102. Using the infrastructure template, the provisioning engine 208 provisions resources in a safe, repeatable manner, and allow users to build and rebuild the infrastructure and applications without having to perform manual actions on behalf of a user, or write custom scripts. Further, the service provider network 102 may include a stack generation component 210 configured to, when executed by the processor(s) 202, perform the receiving of infrastructure templates, determining appropriate resources, and/or compiling the resources needed for a computing resource stack operations described herein for providing the computing resource stack according to the terms designated by the user(s) 122(A) and 122(B).

The computer-readable media 206 may include additional components for managing configuration drift, such as a drift detection component 212, a comparison component 214, and a resource management component 216. The drift detection component 212 may, when executed by the processor(s) 202, detect configuration drift caused, for example, by out-of-band configuration setting changes by one or more of the users 122(A) or 122(B). The drift detection component 212 may detect the drift in response to a request by a user 122(A) or 122(B) to review the current configuration settings of the computing resource stack 104 and an infrastructure template used to provision the resources of the computing resource stack. In another example, the drift detection component 212 may detect the drift automatically by identifying a difference between a configuration setting included in an infrastructure template and the current state of the computing resource stack settings on a periodic basis or based on a defined schedule. The drift detection component 212 may utilize the comparison component 214 to compare values of an infrastructure template used to provision computing resources (e.g., using a baseline snapshot) to values representing a current/live state of the computing resources returned from an API action.

The resource management component 216 may, when executed by the processor(s) 202, update the computing resource stack 104 based on an updated template received in response detected configuration drift. For example, the resource management component 216 may verify that an updated template received from a user in response to a drift detection notification corresponds to the current/live state of the computing resources. To perform this verification, the comparison component 214 may compare values of an intended state of the computing resources represented by the updated infrastructure template correspond to values representing the current/live state of the computing resources. Then, in some examples, the resource management component 216 may replace a previous template used by the stack generation component 210 to execute workflows according to the updated template having one or more configuration settings that reflect a current state of the computing resources.

The service provider network 102 may also include computer-readable media 206 that stores various executable components (e.g., software-based components, firmware-based components, etc.). In addition to various components discussed in FIG. 1, the computer-readable-media 206 may further store components to implement functionality described herein.

FIG. 3 illustrates a graphical user interface (GUI) 300 displaying details of drift detection for a selected computing resource from a resource stack according to various embodiments. The GUI 300 includes a stack management console 302, which further includes a computing resource list 304. In examples, the computing resource list 304 is a list of computing resources that make up a computing resource stack that has been analyzed for preforming configuration drift detection. In addition, the computing resource list 304 may be a list of computing resources that make up a computing resource stack that has been analyzed for verifying that an updated infrastructure template corresponds to a current/live state of the computing resources. The entries on the computing resource list 304 represent separate computing resources and include information related to the computing resource including a logical identifier of the resource, a physical identifier of the resource (for example, a resource URI or other identifier), an identifier of the type of computing resource (for example, a server instance, a container, a database instance, a storage volume, a security policy, a networking configuration, a virtual private cloud (VPC), a logging configuration, and so forth), an indication of whether configuration settings for the computing resource have drifted, and a timestamp indicating when configuration drift for the computing was last performed. In the case of verifying that an updated infrastructure template corresponds to a current/live state of computing resources, the indication of whether configuration settings for the computing resource have drifted may be replaced with an indication of whether the intended state represented by the updated infrastructure template corresponds to the current/live state of the computing resources.

The computing resources included in the computing resource list 304 may be selected, and various information about configuration drift that has been detected for the selected computing resource may be displayed in the console 302. For example, the second entry in the computing resource list 304 (a queue computing resource) has been selected, possibly based on receiving a notification that configuration drift has occurred for the computing resource. In this example, configuration drift information is displayed including expected configuration settings 306, current configuration settings 308, and differences 310. The expected configuration settings 306, for example, may correspond to information from a baseline configuration snapshot that was generated for the selected computing resource, or may be determined from an infrastructure template used to create the computing resource itself. In the case of verifying that an updated infrastructure template corresponds to a current/live state of computing resources, the expected configuration settings 306 may correspond to the intended state represented by the updated infrastructure template that was generated for the selected computing resource.

The textual representation of the expected configuration settings 306 may be generated, for example, by a function of the infrastructure modeling service 112 that converts configuration settings information obtained for a resource (for example, as obtained using an API request to the service at which the computing resource is implemented to describe the configuration settings) into a snippet of text describing the configuration settings. The syntax may, for example, correspond to syntax used to create and use infrastructure templates at the infrastructure modeling service 112. Similarly, the current configuration settings 308 may correspond to information from a current configuration of the selected computing resource that was generated for the resource and that has been converted into a snippet of text describing the current configuration settings.

In some examples, the displayed differences 310 may highlight several different types of configuration drift that have occurred from the expected or baseline configuration settings 306 compared to the current configuration settings 308. For example, the configuration setting with the parameter name "RedrivePolicy" is bolded in FIG. 3 to indicate that the configuration setting has been removed in the current configuration settings 308. The configuration setting with the parameter name "VisibilityTimeout" is shown in italics to indicate that the value associated with the configuration setting has changed (for example, the associated value was "60" in the baseline configuration and modified to "600" in the current configuration). The configuration settings with the parameter names "KMSMasterKeyId" and "KMSDataKeyReusePeriod" are shown bolded and underlined to indicate that these configuration settings were not present in the baseline configuration settings and later added. In some embodiments, various types of configuration settings drift, including modified configuration settings, deleted configuration settings, and added configuration settings, can be presented to a user in various ways in a GUI including use of different colors, highlighting, typefaces, and so forth. Although not explicitly pictured, when verifying an updated infrastructure template, the displayed differences 310 may also include changes to default values of the computing resources (e.g., values that are set by the infrastructure modeling service and not provided as part of an original infrastructure template used to provision the resources) that may result from implementing the updated infrastructure template.

In some embodiments, the infrastructure modeling service 112 can analyze information indicating configuration drift and present information describing additional context related to the identified configuration changes. For example, if a configuration drift analysis indicates that a remote storage volume that was previously attached to a VM instance has been removed from the instance (for example, by identifying that the corresponding baseline configuration information for the removed storage volume has been deleted in the current settings), the infrastructure modeling service 112 can present information indicating the changes to the configuration information and may also present an indication of the effect of the changes (for example, by graphically displaying the removal of a remote storage volume from an instance or providing other types of descriptive information related to the configuration change).

Additionally, in some examples, the infrastructure modeling service 112 provides various ways for a user to remediate configuration drift that has been detected. For example, a GUI or APIs may be provided that enable users to select identified instances of configuration drift and indicate whether the user wants to accept the configuration drift and update a corresponding infrastructure template, revert the drifted configuration settings to a baseline configuration (for example, reverting modified configuration values, recreating deleted computing resources, and so forth), or perform other types of remediating actions. In some embodiments, a user may set a policy that indicates automated processes for remediating configuration drift. For example, a policy may indicate that a user always wants to have modified configuration settings revert back to a baseline configuration when possible, or that the user wants to confirm or deny each configuration setting reversion, and so forth.

Further, in some examples, the infrastructure modeling service 112 outputs the interface 300 at a user device 124(B) when a user 122(B) attempts to make an out-of-band modification to the computing resources of the computing resource stack 104. For instance, the infrastructure modeling service 112 may notify the user 122(B) of expected configuration settings 306 as indicated in a baseline snapshot of the computing resources, current configuration settings 308 that would result from the out-of-band modification proposed by the user 122(B), and differences 310 that would result from the out-of-band modification. By providing the user 122(B) with the interface 300 at the time of an out-of-band modification, the user may decide to alter the out-of-band modification to the computing resources, forego making the out-of-band modification, or instead provide an updated infrastructure template to the infrastructure modeling service to maintain consistency between the interrelated computing resources as part of the change.

However, as described above, the infrastructure modeling service 112 may allow a user to provide an updated infrastructure template that resolves the identified differences 310 caused by the configuration drift. The updated infrastructure template 310 may revert the modified configuration settings to the baseline settings, modify the baseline settings to match the modified configuration settings, provide settings that are different from both the baseline settings and the modified settings (e.g., a "middle point" of the difference between the settings, increasing or decreasing the baseline setting more than was modified in the modified settings as a safety measure for future workflows, etc.), and so forth. The updated infrastructure template may be used to bring the interrelated computing resources into alignment with one another such that the computing resources are reliably harmonized to deliver the services desired by users.

Figure 4A:
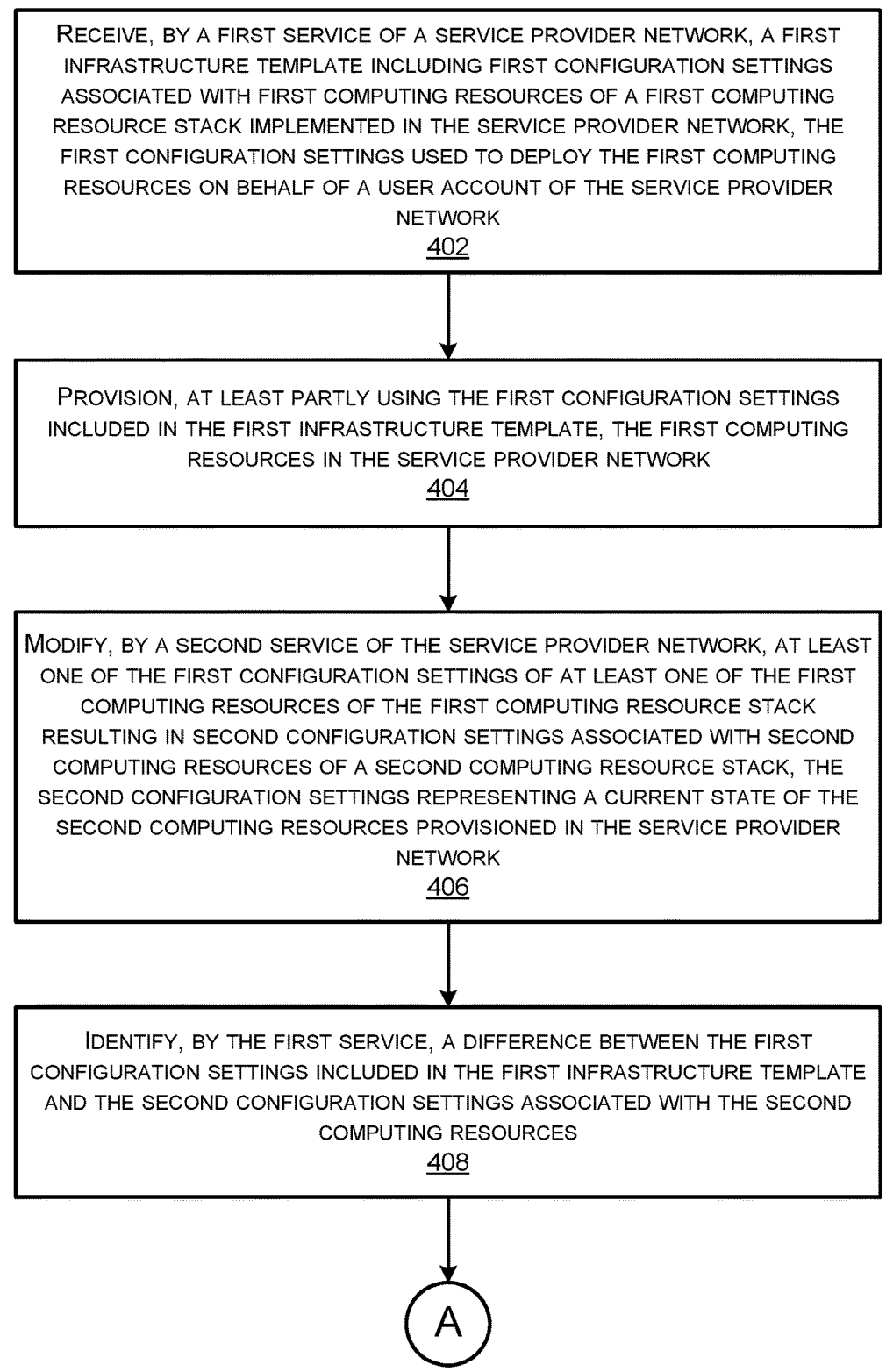
FIGS. 4A and 4B illustrate a flow diagram of an example method for provisioning computing resources based on an infrastructure template, modifying configuration settings, identifying differences between configuration settings in the infrastructure template and the modified settings, outputting information indicating the difference, and receiving an additional infrastructure template to replace the infrastructure template.
Figure 4B:
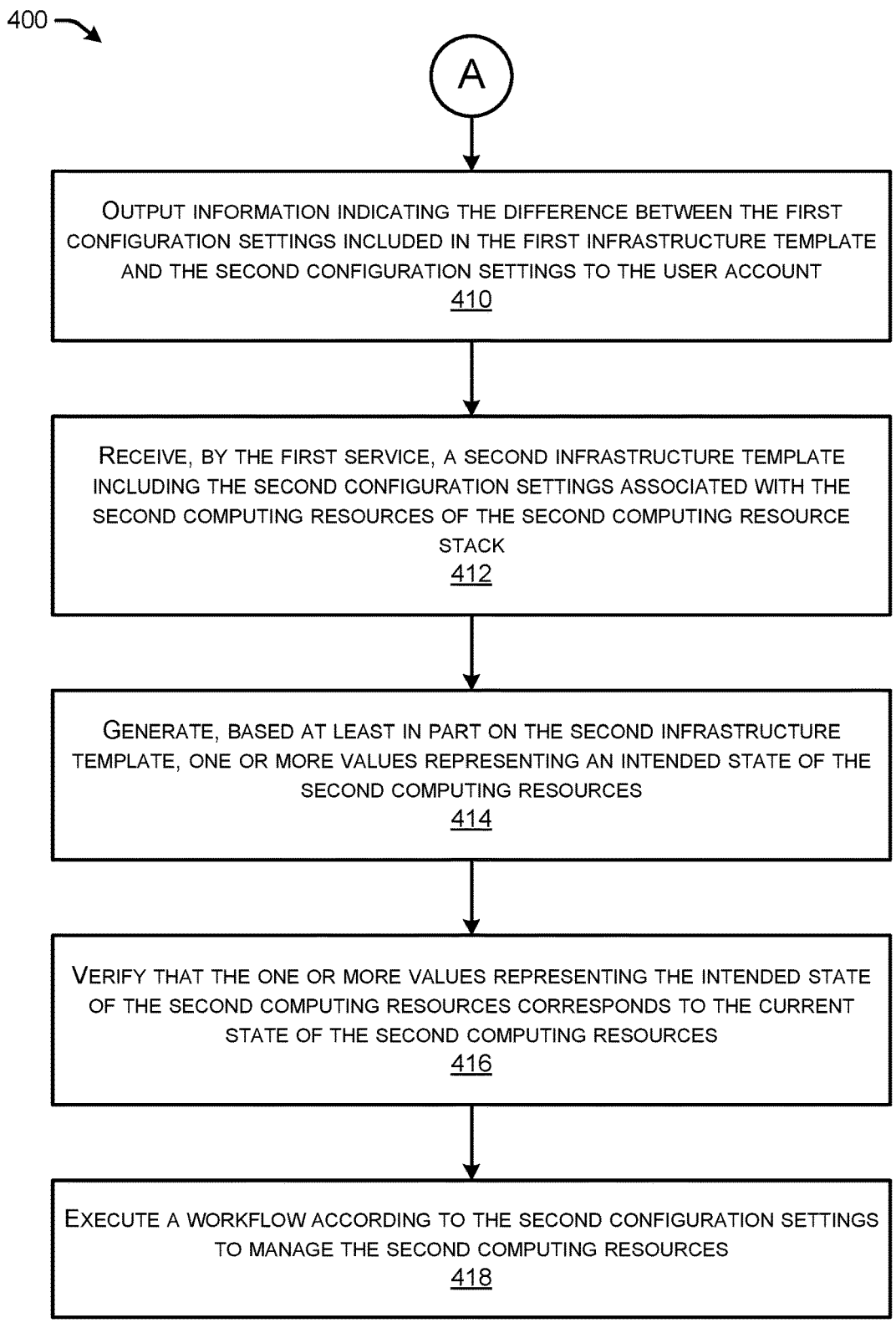
Figure 5:
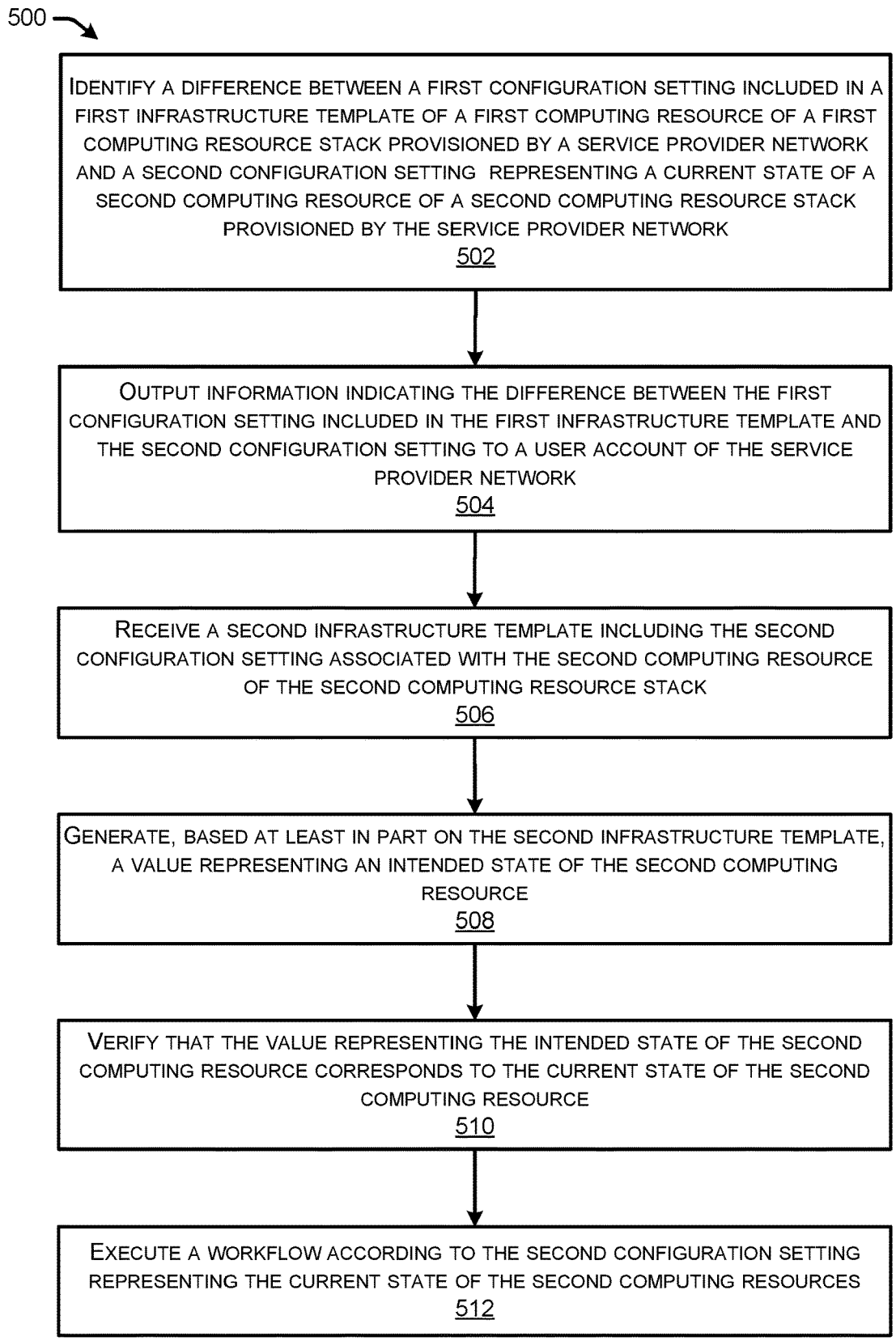
FIG. 5 illustrates a flow diagram of an example method for identifying a difference between a configuration setting included in an infrastructure template and a second configuration setting representing a current state of a second computing resource stack, and receiving a second infrastructure template including the second configuration setting to use to execute a workflow.

FIGS. 4A, 4B, and 5 illustrate flow diagrams of example methods 400 and 500 that illustrate aspects of the functions performed at least partly by the service provider network 102 as described in FIGS. 1A, 1B, and 2. The logical operations described herein with respect to FIGS. 4A, 4B, and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4A, 4B, and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIGS. 4A and 4B illustrate a flow diagram of an example method 400 for provisioning computing resources based on an infrastructure template 120, modifying configuration settings, identifying differences between configuration settings in the infrastructure template 120 and the modified settings, outputting information indicating the difference, and receiving an additional infrastructure template to replace the infrastructure template 120.

At 402, a first service (e.g., the infrastructure modeling service 112) of the service provider network 102 receives a first infrastructure template 120 that includes first configuration settings associated with first computing resources of a first computing resource stack 104 implemented in the service provider network 102. In some examples, the first configuration settings are used to deploy the first computing resources on behalf of a user account of the service provider network 102, such as a user account associated with the user 122(A) and/or 122(B). At 404, the first computing resources are provisioned in the service provider network 102 at least partly using the first configuration settings included in the first infrastructure template 120. In an illustrative example, the first infrastructure template 120 may provide for 200 database instances, where workflows such as such as writing values to the database instances, performing software updates on the database instances, and/or performing other workflow types (e.g., video encoding, batch processing, data migration, etc.) may be performed using these 200 database instances following the resources being provisioned.

At 406, a second service (e.g., the computing resource service 106) of the service provider network 102 modifies at least one of the first configuration settings of at least one of the first computing resources of the first computing resource stack 104, resulting in second configuration settings associated with second computing resources of a second computing resource stack. In some examples, the second configuration settings represent a current state of the second computing resources provisioned in the service provider network 102. In some cases, the second computing resource stack may represent the first computing resource stack as modified, while in some other cases the second computing resource stack may be a different computing resource stack also associated with the user account of the service provider network 102. Continuing with the illustrative example above, an additional 50 database instances may be added to the 200 original database instances as an out-of-band modification to account for an increase in activity and/or workflows. In this case, the additional 50 database instances are not accounted for in the original infrastructure template 120, and thus may not receive appropriate software updates or workflows that are designated by the original infrastructure template.

At 408, the first service (e.g., the infrastructure modeling service 112) identifies a difference between the first configuration settings included in the first infrastructure template 120 and the second configuration settings associated with the second computing resources. At 410, information indicating the difference between the first configuration settings included in the first infrastructure template 120 and the second configuration settings is output to the user account.

At 412, the first service (e.g., the infrastructure modeling service 112) receives a second infrastructure template including the second configuration settings associated with the second computing resources of the second computing resource stack. Further, at 414, one or more values representing an intended state of the second computing resources is generated based, at least in part, on the second infrastructure template. For instance, the infrastructure modeling service 112 may provide an API action to determine the one or more values that would result if the second infrastructure template was implemented, without causing any changes to the computing resources themselves. At 416, the one or more values representing the intended state of the second computing resources are verified to correspond to the current state of the second computing resources. In some examples, the one or more values representing the intended state of the second computing resources may be compared to one or more corresponding values for computing resources in the current/live state.

At 418, a workflow is executed according to the second configuration settings to manage the second computing resources. Again continuing with the illustrative example above, the second infrastructure template may designate the 250 total database instances (e.g., the 200 original database instances, plus the 50 database instances that were added as an out-of-band modification) that are part of the interrelated set of computing resources. Therefore, the functionality provided by the database instances remains standardized across the database instances, enabling configuration compliance and faster troubleshooting should problems arise.

In some examples, the second service (e.g., the computing resource services 106) may modify the at least one of the first configuration settings out-of-band, without first modifying the infrastructure template 120 included in the infrastructure modeling service 112 used to provision the first computing resources. Additionally, in some instances, the identified instances of configuration drift can include one or more of: a modification to a configuration setting defined in the infrastructure template used to create the computing resource stack, a modification to a default configuration setting associated with a computing resource of the computing resource stack, a deletion of a configuration setting associated with a computing resource of the computing resource stack, an addition of a configuration setting, and a deletion of a computing resource of the computing resources stack.

FIG. 5 illustrates a flow diagram of an example method 500 for identifying a difference between a configuration setting included in an infrastructure template 120 and a second configuration setting representing a current state of a second computing resource stack, and receiving a second infrastructure template including the second configuration setting to use to execute a workflow.

At 502, the service provider network 102 may identify a difference between a first configuration setting included in a first infrastructure template of a first computing resource stack provisioned by the service provider network 102, and receive a second configuration setting representing a current state of a second computing resource stack provisioned by the service provider network.

At 504, the service provider network 102 may output information indicating the difference between the first configuration setting included in the first infrastructure template and the second configuration setting to a user account of the service provider network. At 506, the service provider network 102 may receive a second infrastructure template including the second configuration setting associated with the second computing resource of the second computing resource stack.

At 508, a value representing an intended state of the second computing resource is generated based at least in part on the second infrastructure template. Further, at 510, the value representing the intended state of the second computing resource is verified to correspond to the current state of the second computing resource.

At 512, the service provider network 102 may execute a workflow according to the second configuration setting representing the current state of the second computing resources.

Figure 6:
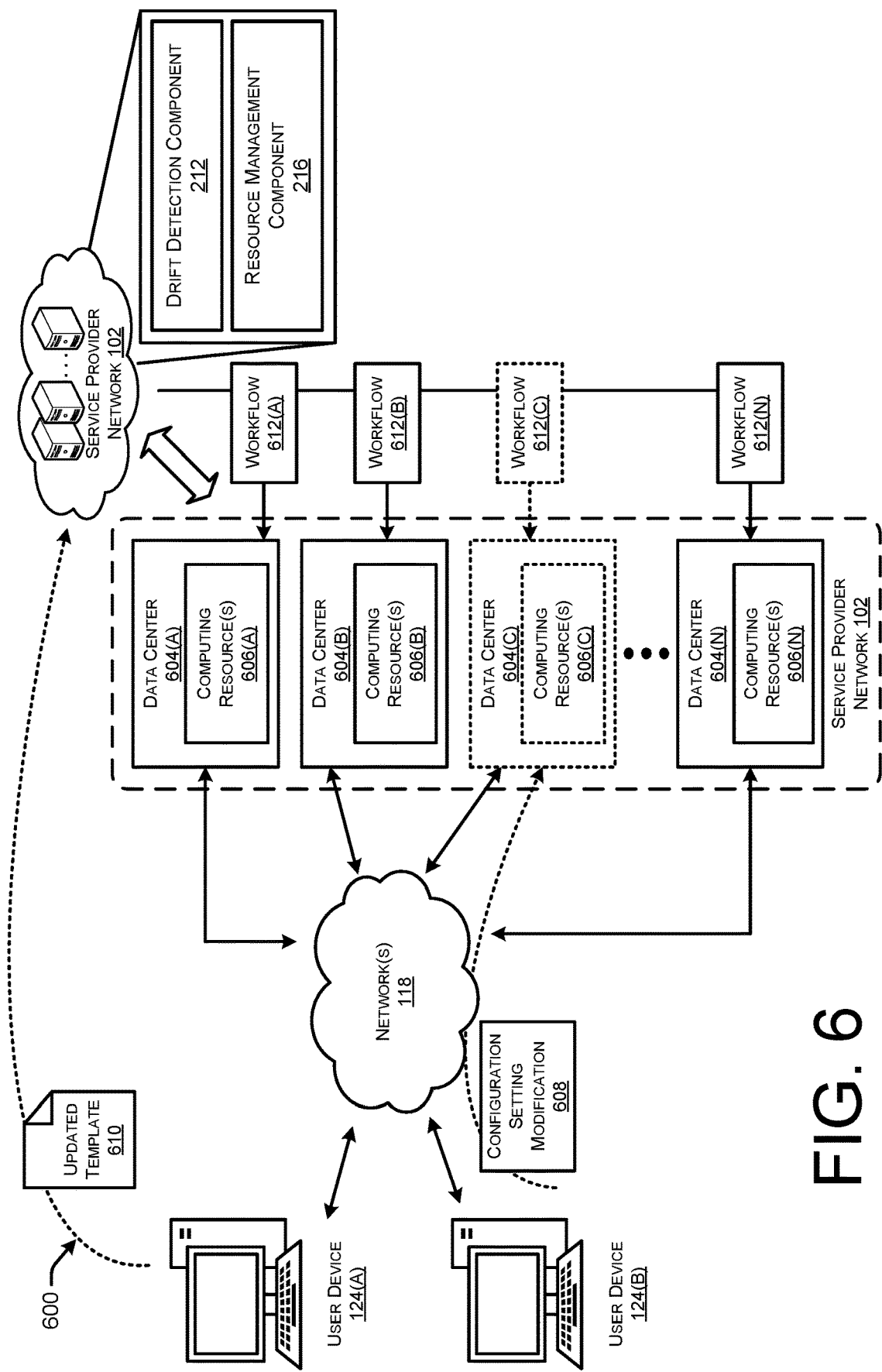
FIG. 6 illustrates a system and network diagram that shows an illustrative operating environment that includes a service provider network that can be configured to implement aspects of the functionality described herein.

FIG. 6 is a system and network diagram that shows an illustrative operating environment 600 that includes a service-provider network 102 (that may be part of or associated with a cloud-based service network/platform) that can be configured to implement aspects of the functionality described herein.

The service-provider network 102 can provide computing resources 606, like VM instances and storage, on a permanent or an as-needed basis. Among other types of functionality, the computing resources 606 provided by the service-provider network 102 may be utilized to implement the various cloud-based services. The computing resources provided by the service-provider network 102 can include various types of computing resources, such as data processing resources like VM instances, data storage resources, networking resources, data communication resources, application-container/hosting services, network services, and the like.

Each type of computing resource provided by the service-provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service-provider network 102 can also be configured to provide other types of computing resources not mentioned specifically herein.

The computing resources 606 provided by the service-provider network 102 may be enabled in one embodiment by one or more data centers 604(A)-604(N) (which might be referred to herein singularly as "a data center 604" or in the plural as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative embodiment for a data center 604 that can be utilized to implement the technologies disclosed herein will be described below with regard to FIG. 7.

The data centers 604 may be configured in different arrangements depending on the service-provider network 102. For example, one or more data centers 604 may be included in or otherwise make-up an availability zone. Further, one or more availability zones may make-up or be included in a region. Thus, the service-provider network 102 may comprise one or more availability zones, one or more regions, and so forth. The regions may be based on geographic areas, such as being located within a predetermined geographic perimeter.

The users of the service-provider network 102 may access the computing resources 606 provided by the data centers 604 of the service-provider network 102 over any wired and/or wireless network(s) 118 (utilizing a user device 124(A) or 124(B)), which can be a wide area communication network ("WAN"), such as the Internet, an intranet or an Internet service provider ("ISP") network or a combination of such networks. For example, and without limitation, a device operated by aa user of the service-provider network 102 may be utilized to access the service-provider network 102 by way of the network(s) 118. It should be appreciated that a local-area network ("LAN"), the Internet, or any other networking topology known in the art that connects the data centers 604 to remote clients and other users can be utilized. It should also be appreciated that combinations of such networks can also be utilized.

In a distributed computing environment, such as the one included in the service provider network 102, a fleet of VM instances and/or servers may have workflow or processes executed thereon to manage resources. For instance, a patch may need to be installed on each VM instance and/or resource at a particular time. In such distributed applications of workflows or processes, a load balance may be at the front end in front of the fleet of servers where a request for a workflow comes in, and the load balancer distributes the request to execute the workflow amongst the servers. In some examples, the drift detection component 212 and the resource management component 216 may be located before the load balancer such that, workflows are not executed by the datacenters when discrepancies exist between an infrastructure template and a current state of one or more of the computing resources.

In some examples, the service provider network 102 may receive a configuration setting modification 608 that modifies a computing resource of a data center, in this case computing resource 606(C) of data center 604(C), which may be out-of-band from an infrastructure modeling service of the service provider network 102. For instance, the configuration setting modification 608 may modify the storage capacity of the computing resource 606(C) of the data center 604(C), such as in response to increased network traffic. The drift detection component 212 may detect such a change, such as by comparing a baseline snapshot of computing resources based on an original infrastructure template used to provision the data centers 604(A)-604(N) to current configuration settings of the service provider network 102. Then, the drift detection component 212 may output a notification of the detected drift to a user device 124(A) as described above, and receive an updated template 610 which resolves the differences, such as by including configuration settings representing the current state of the computing resources, including data centers 604(A)-604(N). Having the updated infrastructure template 610 allows the service provider network 102 to execute workflows 612(A)-612(N) using all of the data centers 604(A)-604(N), including the added storage to data center 604(C), whereas prior to receiving the updated infrastructure template 610 the service provider network would only be aware of the originally-indicated storage and thus may not be able to execute workflow 612(C) with data center 604(C).

Figure 7:
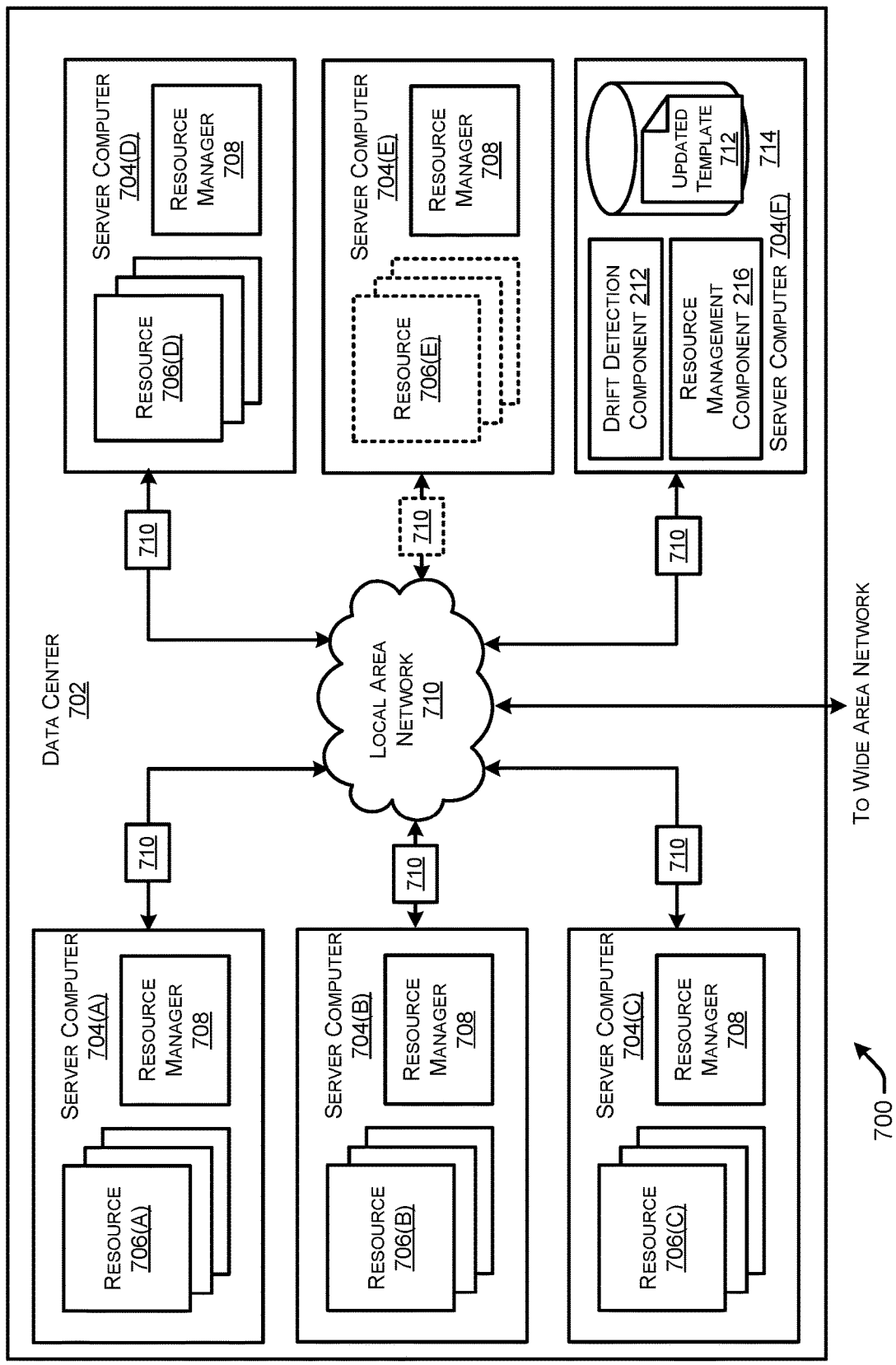
FIG. 7 illustrates a computing system diagram illustrating a configuration for a data center that can be utilized to implement aspects of the technologies disclosed herein.

FIG. 7 is a computing system diagram 700 illustrating a configuration for a data center 702 which may correspond to one or more of the data centers 604(A)-604(N) of FIG. 6 and can be utilized to implement aspects of the technologies disclosed herein. The example data center 702 shown in FIG. 7 includes several server computers 704(A)-704(F) (which might be referred to herein singularly as "a server computer 704" or in the plural as "the server computers 704") for providing computing resources 706(A)-706(E). In some examples, the resources 706 and/or server computers 704 may include, or correspond to, the computing resources 706 described herein.

The server computers 704 can be standard tower, rack-mount, or blade server computers configured appropriately for providing the computing resources described herein (illustrated in FIG. 7 as the computing resources 706(A)-706(E)). The computing resources provided by the service-provider network 102 can be data processing resources such as VM instances or hardware computing systems, database clusters, computing clusters, storage clusters, data storage resources, database resources, networking resources, and others. Some of the servers 704 can also be configured to execute a resource manager 708 capable of instantiating and/or managing the computing resources. In the case of VM instances, for example, the resource manager 708 can be a hypervisor or another type of program configured to enable the execution of multiple VM instances on a single server computer 704. Server computers 704 in the data center 702 can also be configured to provide network services and other types of services.

In the example data center 702 shown in FIG. 7, an appropriate LAN 710 is also utilized to interconnect the server computers 704(A)-704(F). It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the server computers 704(A)-704(F), data centers including the data center 702, and, potentially, between computing resources in each of the server computers 704. It should be appreciated that the configuration of the data center 702 described with reference to FIG. 7 is merely illustrative and that other implementations can be utilized.

In some examples, the server computer 704(F) may include the drift detection component 212 and the resource management component 216. In such examples, infrastructure modeling service 112 and the computing resource services 106 may execute on the server computer 704(F), and the drift detection component 212 may detect configuration drift caused by, for example, an out-of-band modification made to a computing resource configuration setting. For example, the computing resource 706(E) may receive an out-of-band modification as indicated by the dashed outline, resulting in configuration drift. Accordingly, a workflow 710 to be executed by the server computers 704 may execute by the server computer 704(E) improperly, if at all. However, the resource management component 216 may receive an updated infrastructure template 712 to resolve the configuration drift, and the resource management component 216 may replace a previous infrastructure template stored in a datastore 714 with the updated infrastructure template. Therefore, the workflow 710 may be executed as desired by the server computers 704, including the server computer 704(E) according to the current configuration settings included in the updated infrastructure template 712. Accordingly, the techniques described herein may be implemented in a data center 702 of distributed computers 704 or servers, in desired examples.

Figure 8:
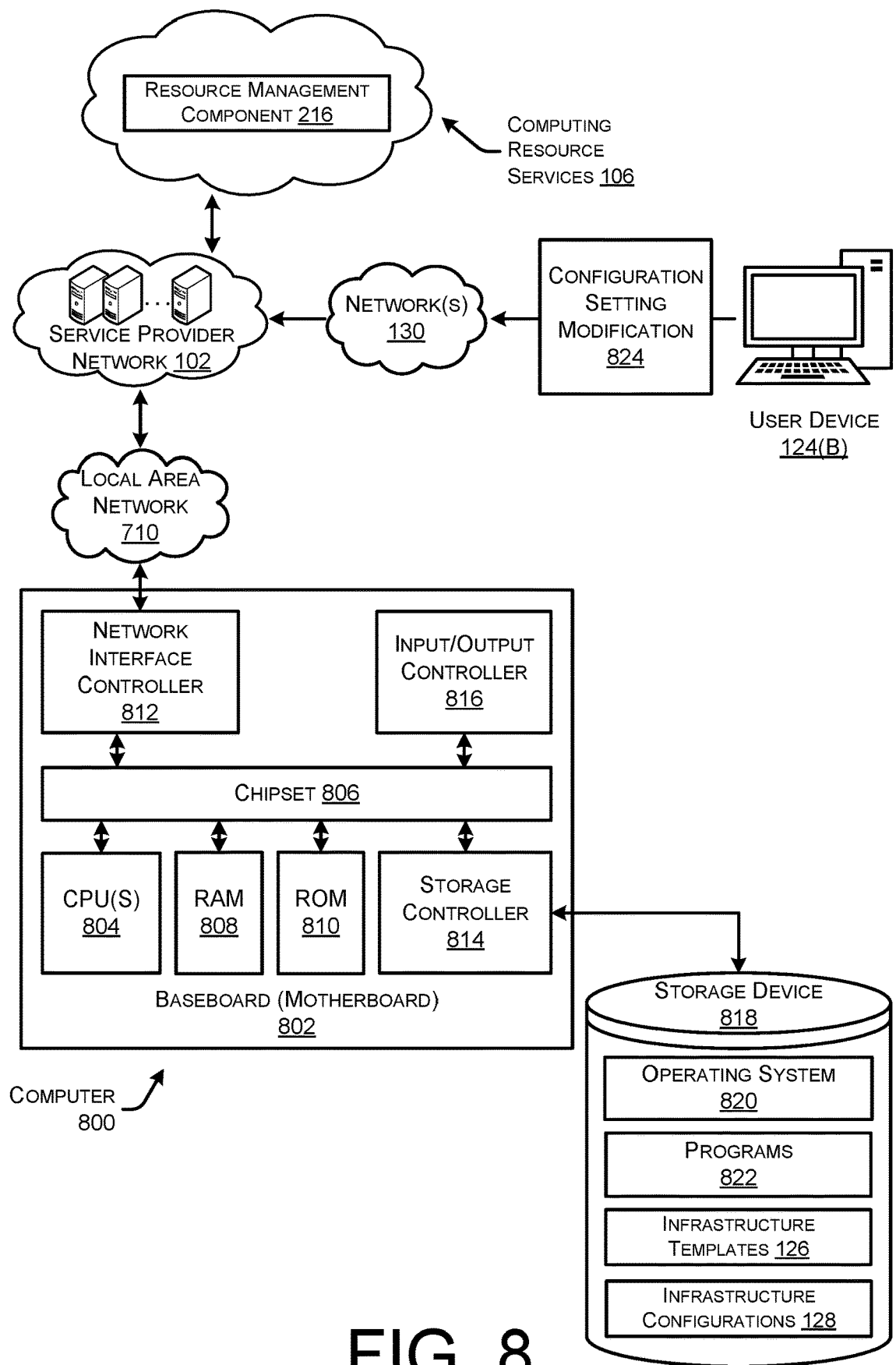
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 610. The chipset 806 can include functionality for providing network connectivity through a NIC 812, such as a gigabit Ethernet adapter. The NIC 812 is capable of connecting the computer 800 to other computing devices over the network 610. It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820, programs 822, and data, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the service provider network 102, and or any components included therein, may be supported by one or more devices similar to computer 800. Stated otherwise, some or all of the operations performed by the service-provider network 102, and or any components included therein, may be performed by one or more computer devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The mass storage device 818 can store other system or application programs and data utilized by the computer 800.

In one embodiment, the mass storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-7. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

As shown in FIG. 8, the storage device 818 may comprise a particular type of hardware storage that is configured to provide storage for the infrastructure templates, and store the infrastructure configurations used to detect configuration drift. In this way, the computer 800 may utilize a configuration setting modification request 824 received from a user device 124(B) to modify a computing resource stack, and leverage the resource management component 216 to resolve differences detected from configuration drift in the computing resource services 106.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for detecting configuration drift in a cloud-based provider of multi-tenant computing resources, comprising:
 receiving an infrastructure template;
 provisioning, by a service provider, a computing resource of a computing resource stack on behalf of a user of the service provider;
 receiving an update to the infrastructure template, the update including a first configuration setting;
 modifying the computing resource stack based on the first configuration setting;
 detecting, by the service provider, configuration drift between the first configuration setting and a second configuration setting representing a current state of the computing resource by comparing the first configuration setting to the second configuration setting;
 outputting, to the user, an indication of the configuration drift between the first configuration setting and the second configuration setting; and
 reverting the computing resource to match the first configuration setting.

2. The method of claim 1, wherein the service provider detects configuration drift by comparing stored infrastructure configurations to the current configuration settings of the computing resource.

3. The method of claim 1, wherein the first configuration setting indicates an existence of the computing resource and the second configuration setting indicates a deletion of the computing resource.

4. The method of claim 1, wherein the service provider detects configuration drift by periodically comparing the first configuration setting and the second configuration setting.

5. The method of claim 1, wherein the service provider detects configuration drift by comparing the first configuration setting and the second configuration setting on a defined schedule.

6. The method of claim 1, further comprising receiving the second configuration setting from a service at which the computing resource is implemented.

7. A method for detecting configuration drift in a cloud-based provider of multi-tenant computing resources, comprising:
 provisioning, by a service provider, a computing resource of a computing resource stack on behalf of a user of the service provider;
 detecting, by the service provider, configuration drift between a first configuration setting representing a previous state of the computing resource and a second configuration setting representing a current state of the computing resource by comparing the first configuration setting to the second configuration setting;
 outputting, to the user, an indication of the configuration drift between the first configuration setting and the second configuration setting;
 outputting to the user a remediation plan, the remediation plan including proposed configuration settings for resolving the configuration drift;
 receiving a third configuration setting selected from among the proposed configuration settings; and
 modifying the computing resource to match the third configuration setting.

8. The method of claim 7, wherein the service provider detects configuration drift by comparing stored infrastructure configurations to the current configuration settings of the computing resource.

9. The method of claim 7, wherein the first configuration setting indicates an existence of the computing resource and the second configuration setting indicates a deletion of the computing resource.

10. The method of claim 7, wherein the service provider detects configuration drift by periodically comparing the first configuration setting and the second configuration setting.

11. The method of claim 7, wherein the service provider detects configuration drift by comparing the first configuration setting and the second configuration setting on a defined schedule.

12. The method of claim 7, further comprising receiving the second configuration setting from a service at which the computing resource is implemented.

13. A system comprising:
 one or more processors; and
 one or more computer-readable media storing computer executable instructions that, when executed by the one or more processors, cause the one or more processors to perform operations comprising:
 receiving an infrastructure template;
 provisioning, by a service provider and using the infrastructure template, a computing resource of a computing resource stack on behalf of a user account of the service provider;
 receiving an update to the infrastructure template, the update including a first configuration setting;
 modifying the computing resource stack based at least in part on the first configuration setting;
 detecting, by the service provider, a difference between the first configuration setting and a second configuration setting that represents a current state of the computing resource by comparing the first configuration setting with the second configuration setting; and
 modifying the computing resource to match the first configuration setting.

14. The system of claim 13, wherein the service provider detects the difference by comparing stored infrastructure configurations to the current configuration settings of the computing resource.

15. The system of claim 13, wherein the first configuration setting indicates an existence of the computing resource and the second configuration setting indicates an absence of the computing resource.

16. The system of claim 13, wherein the service provider detects the difference by periodically comparing the first configuration setting and the second configuration setting.

17. The system of claim 13, wherein the service provider detects the difference by comparing the first configuration setting and the second configuration setting on a defined schedule.

18. The system of claim 13, the operations further comprising receiving the second configuration setting from a service at which the computing resource is implemented.

19. The system of claim 13, wherein the difference is based on one or more of:
 a modification to a configuration setting defined in the infrastructure template;
 a modification to a default configuration setting associated with the computing resource;
 a deletion of a configuration setting;
 an addition of a configuration setting; or
 a deletion of a particular computing resource.

20. The system of claim 13, providing the user account with access to an indication of the difference between the first configuration setting and the second configuration setting.

\* \* \* \* \*